Figure 1:
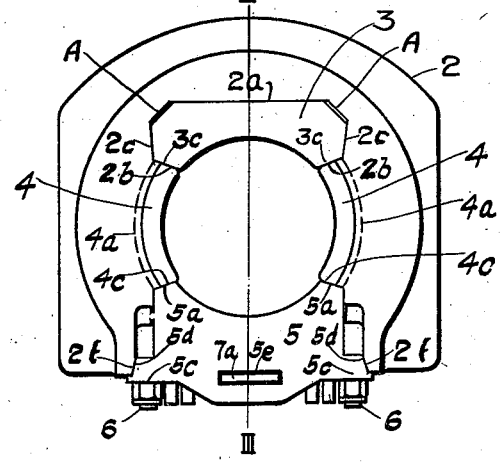

June 10, 1930.                H. SWOYER                1,763,019
                    DRIVING BOX FOR LOCOMOTIVE ENGINES
                Filed June 1, 1925        2 Sheets-Sheet 1

INVENTOR
Harry Swoyer
BY
Clarence Kerr
ATTORNEY

June 10, 1930.                    H. SWOYER                    1,763,019
DRIVING BOX FOR LOCOMOTIVE ENGINES
Filed June 1, 1925          2 Sheets-Sheet 2
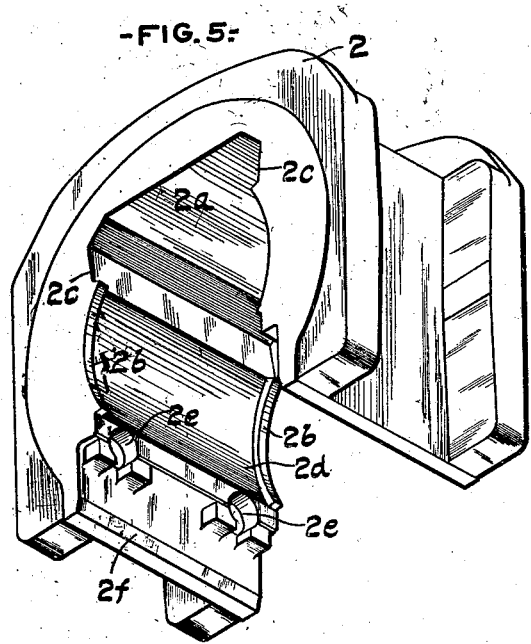
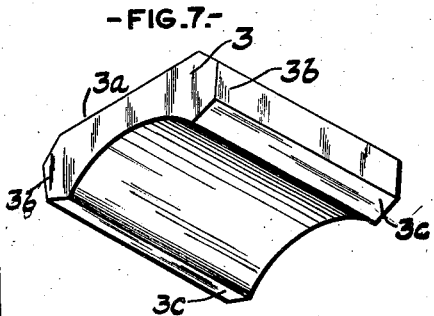
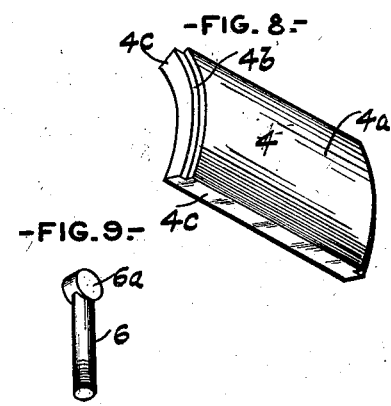
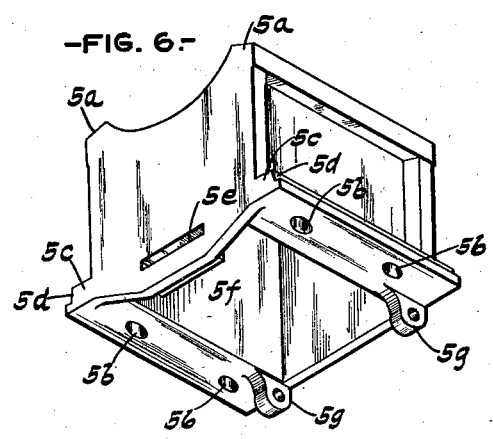
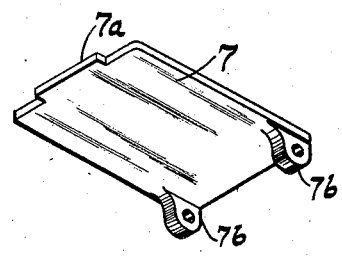
INVENTOR
Harry Swoyer
BY
Clarence D Kerr
ATTORNEY Patented June 10, 1930

1,763,019

UNITED STATES PATENT OFFICE

HARRY SWOYER, OF DUNKIRK, NEW YORK

DRIVING BOX FOR LOCOMOTIVE ENGINES

Application filed June 1, 1925. Serial No. 33,890.

My invention relates to journal boxes of the type used for the driving axles of locomotives and has for one of its objects an improved construction of the bearing members and their disposition so as to minimize the fore and aft wear caused by the piston thrust of the engine and to prevent the box from lifting off of the journal. Further objects are the provision of means for the ready adjustment of the parts without having to remove the wheels from the engine, of the assembly of the complete structure in a space no greater than required for driving boxes of ordinary design, of a lubricant containing cellar which serves the combined purposes of preventing the box from closing in at the bottom when heated and of securing the bearing members in position.

Driving boxes with the usual pressed-in, crescent shaped crown brass are subject to internal strain due to this pressing in operation and, therefore, have a tendency to distort by closing in at the bottom when excessive heating results either from lack of lubrication or from other causes. Various devices have been devised to overcome these difficulties but have been ineffective because they have failed to recognize that the internal strain set up when pressing in the crown brass is one of the chief contributing causes to box distortion. To overcome these defects I employ a crown bearing of novel shape which is secured in the box with a comparatively light pressure, and by reason of its fit in the box and its reinforcement, it is capable of absorbing in itself considerable distortion instead of passing it on to be taken up in the body of the box.

As the fore and aft action of the piston thrust causes rapid wear on the bearing at the center line of the journal, I have provided renewable bearing members to compensate for this wear. In the practice of my invention the side bearings are simple in form; are capable of easy machining operations; are amply substantial for the work they must perform; are easily insertable and removable with the box in place under the locomotive, and, furthermore, no additional mechanism is required to secure them in position as the lubricant containing cellar is made to perform this function. Since the cellar must remain rigidly in place in order to maintain the side bearings in correct position, means for replenishing the supply of lubricant are provided through the use of a drop bottom easily removed and replaced in the cellar without disturbing the attachment of the cellar to the box. At the same time the stiffness of the rectangular cellar construction is utilized to form a rigid member across the bottom of the box, drawn into position by the wedging action of oppositely inclined tapering sides, to oppose distortion of the box, and to maintain the sides of the box vertical and parallel.

The improvement claimed is hereinafter fully set forth.

Figure 4:
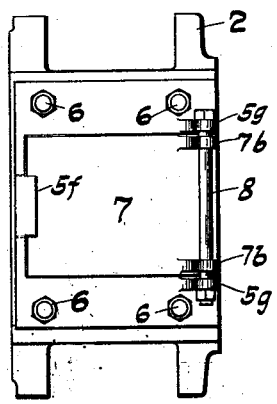
Figure 2:
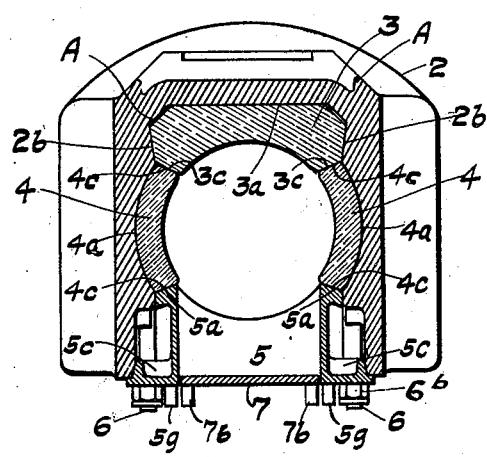
Figure 3:
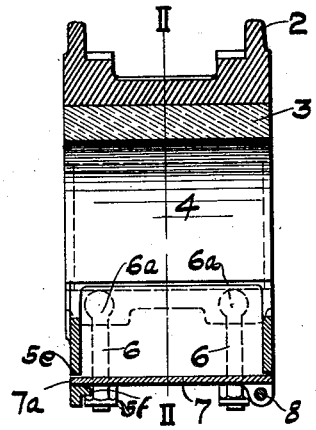

In the accompanying drawings: Figure 1 is a view, in elevation, of the inner end of a driving box, embodying the invention; Fig. 2, a central vertical longitudinal section through the same, taken on the line II—II, Fig. 3; Fig. 3, a vertical, transverse section, taken on the line III—III of Fig. 1; Fig. 4, a bottom plan view of the same; Fig. 5, a perspective view of the driving box, with the cooperating parts removed; Fig. 6, a similar view of the cellar, showing its bottom open; and, Figs. 7, 8, 9 and 10, perspective views of the crown brass; of one of the supplemental bearings; of one of the cellar bolts; and of the cellar bottom, respectively.

In the practice of the invention, referring descriptively to the specific embodiment thereof which is herein exemplified, the driving box 2 in the upper part of the journal cavity is recessed for reception of the crown bearing 3. The bearing 3 is inserted thereinto under a nominal pressure, considerably less than that used in applying the ordinary brasses, and when applied its top surface fits against a corresponding horizontal surface $2^a$ on the box 2, and is retained in position by laterally-disposed ribs $2^b$ fitting against the inwardly and downwardly sloping sides $2^c$ of the recess. Clearance spaces A are provided between the box and the bearing 3 along the bevelled corners of the bearing to permit expansion of the bearing relative to the box. The crown bearing is thicker at its ends than at its central portion so as to permit ready absorption of heat and thus prevent undue expansion which would have a tendency to cause distortion of the box.

The side bearings 4 have concentric faces, the outer 4$^a$ of which fit against the corresponding faces 2$^d$ at the sides of the bearing cavity of the box. Each bearing 4 has shoulders 4$^b$ cut in either end which engage the inner faces of the ribs 2$^b$ and are thereby held from endwise movement. The top and bottom edges 4$^c$ of the side bearings 4 are bevelled so as to make the bearings symmetrical, and when seated in the box their top edges fit snugly against the lower edges 3$^c$ of the crown bearing. The top edges 5$^a$ of the cellar 5 are bevelled to fit against the bottom surfaces 4$^c$ of the side bearings 4 so as to support the bearings 4 in position.

The lower side walls of the box cavity have recesses 2$^e$ into which fit the round heads 6$^a$ of the bolts 6. The shanks of the bolts 6 extend downwardly through the holes 5$^b$ in the bottom of the cellar casting 5, and the casting 5 is supported by the nuts 6$^b$ carried by the bolts 6. As the cellar is drawn up into position by the bolts the tapered sides 5$^d$ of the cellar flanges 5$^c$ engage the tapered faces 2$^f$ of the box, thus exerting an outward wedging pressure on the lower ends of the box and so forming in effect a strut across the bottom of the box to oppose any tendency of the sides to close in. It will also be seen that as the cellar 5 is drawn up by the bolts 6, it presses the side bearings 4 up against the crown bearing 3, and all three of these bearings firmly against the box, and thus eliminates the necessity of having separate securing means for these parts.

In order to avoid the necessity of taking down the cellar to repack it, which, of course, would disturb the various bearings and require them to be reset, the cellar is so constructed that it may be repacked through the bottom. To effect this it is provided with a separate bottom plate 7 which at one end has a projection 7$^a$ which seats in the slot 5$^e$. The cellar 5 also has a lug 5$^f$ which guides the projection 7$^a$ into the slot 5$^e$ when the bottom is being placed in position. The end of the bottom opposite the projection 7$^a$ when in position is supported by a pin 8 which seats in the apertured lugs 7$^b$ and 5$^g$.

It will be seen that with my improved construction the side bearings may be readily replaced merely by taking down the cellar and without disturbing the driving box.

The invention claimed as new and desired to be secured by Letters Patent is:

1. A locomotive driving box having a journal cavity therein; a crown bearing fitting against the top of said cavity, the said bearing having oppositely inclined sides affording a supporting engagement with the box; other inclined sides out of contact with the box to permit expansion of the bearing without distortion of the box.

2. The combination of a journal; a journal box frame having a journal cavity therein; a crown bearing having an upper face engaging the cavity wall and a lower face on each side of the journal; side bearings each having an upper face opposed to one of said lower faces to support the crown bearing and a lower face; a lubricant cellar having an upper face at each side each opposed to one of said lower faces of the side bearings for supporting the same; and means for adjustably attaching the cellar to the box frame to insure snug engagement between the opposed bearing faces of the crown bearing and the side bearings, and the opposed bearing faces of the side bearings and the cellar, said means comprising bolts having their upper ends anchored to the frame and their lower ends passing through the cellar and nuts on the lower ends of the bolts for vertically adjusting the cellar.

3. The combination of a journal; a journal box frame having a journal cavity therein; a crown bearing having an upper face engaging the cavity wall and a lower face on each side of the journal; side bearings each having an upper face opposed to one of said lower faces to support the crown bearing and a lower face; a lubricant cellar having an upper face at each side each opposed to one of said lower faces of the side bearings for supporting the same, said cellar having a removable bottom enabling the cellar to be refilled with lubricant without disturbing the supporting means; and means for adjustably attaching the cellar to the box frame to insure snug engagement between the opposed bearing faces of the crown bearing and the side bearings, and the opposed bearing faces of the side bearings and the cellar, said means comprising bolts having their upper ends anchored to the frame and their lower ends passing through the cellar, and nuts on the lower ends of the bolts for vertically adjusting the cellar.

4. The combination of a journal; a journal box frame having a journal cavity therein; a crown bearing having an upper face engaging the cavity wall and a lower face on each side of the journal; side bearings each having an upper face opposed to one of said lower faces to support the crown bearing, a lower face, a rear arcuate wall connecting the two faces abutting against a corresponding arcuate wall of the cavity said curvature permitting the bearing to be moved downwardly and centrally of the cavity to free it from its abutting wall said upper and lower faces diverging toward the center of the cavity to urge the side bearing against its abutting wall, and means cooperating with means formed on said abutting wall to prevent longitudinal movement of said bearing; a lubricant cellar having a removable bottom said cellar being fitted in a space in said cavity of greater width than the length of a side bearing through which said side bearings may be removed, said cellar having an upper face at each side each opposed to one of said lower faces of the side bearings for supporting the same; and means for attaching the cellar to the box frame to insure snug engagement between the opposed bearing faces of the crown bearing and the side bearings, and the opposed bearing faces of the side bearings and the cellar, said means comprising vertical bolts having their upper ends anchored to the frame and their lower ends passing through the cellar and nuts on the lower ends of the bolts for supporting the cellar and affording said snug engagement.

HARRY SWOYER.